Feb. 12, 1952  J. M. CLESS  2,585,370
FOLDING WHEEL CHOCK
Filed Nov. 26, 1948
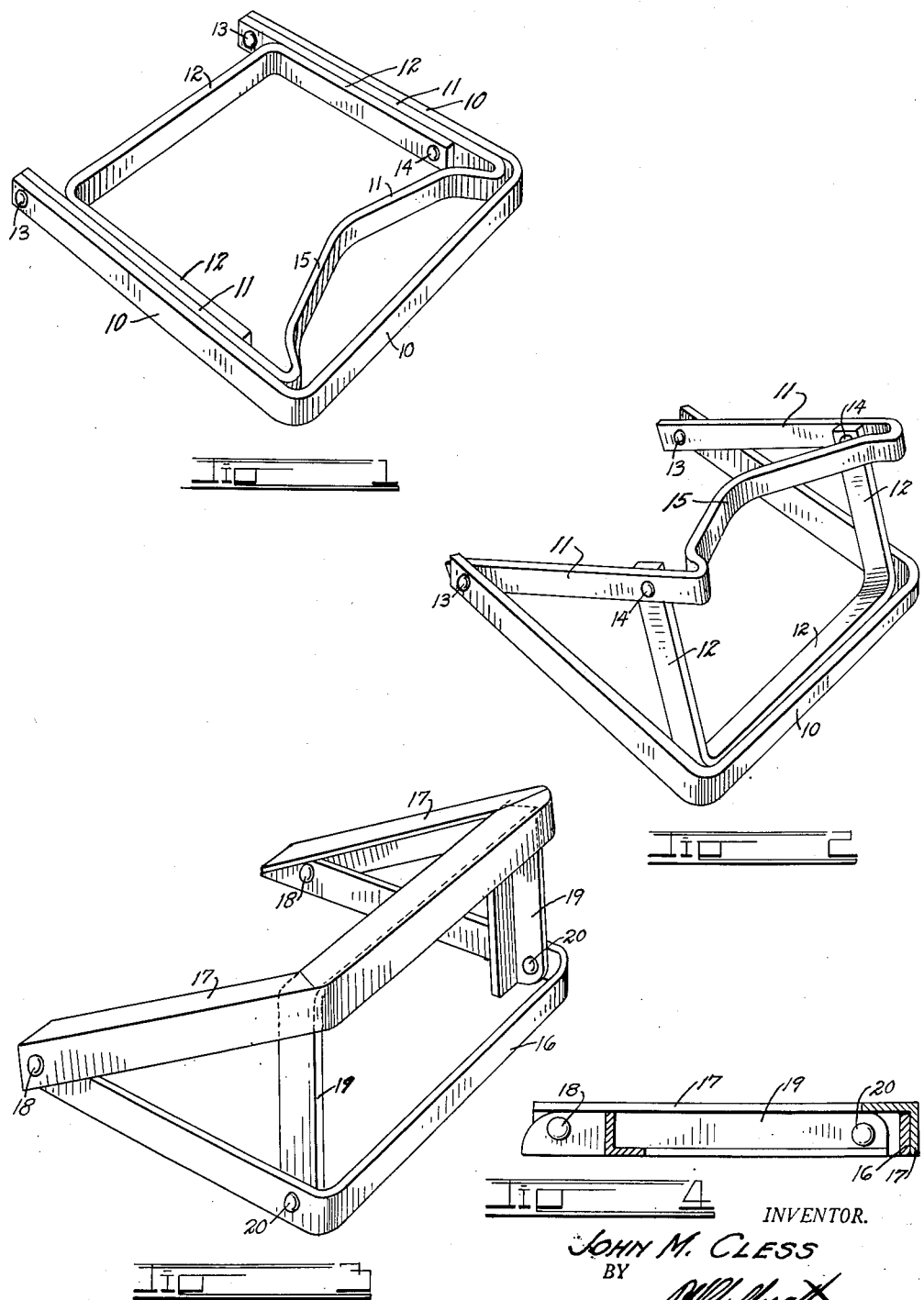
INVENTOR.
John M. Cless
BY
ATTORNEY Patented Feb. 12, 1952

2,585,370

UNITED STATES PATENT OFFICE 2,585,370

FOLDING WHEEL CHOCK

John M. Cless, Pueblo, Colo.

Application November 26, 1948, Serial No. 62,103

1 Claim. (Cl. 188—32)

This invention relates to a wheel chock and has for its principal object the provision of a wheel chock which can be used for securely blocking the wheels of any type of wheeled vehicle and which, when not in use, can be folded flat for convenient storage in the vehicle.

Another object of the invention is to so construct the device that it will be light in weight, easy to fold and unfold and highly efficient in use.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a perspective view of the preferred form of the improved wheel chock illustrating it in the folded position;

Fig. 2 is a similar view illustrating the improved wheel chock in the open position ready for use;

Fig. 3 is a perspective view of an alternate form of the improved wheel folding chock in the open position; and Fig. 4 is a longitudinal section through the chock of Fig. 3 illustrating it in the folded position.

The form of chock illustrated in Figs. 1 and 2 is designed for use on passenger automobiles, aircraft and the like. The type illustrated in Figs. 3 and 4 is more particularly designed for heavy vehicles such as trucks, buses and coaches. The improved wheel chock consists of three U-shaped members, a frame member 10, chock member 11 and a brace member 10, a chock member 11 and a brace member 12. All three of the members are formed by bending bars into a substantially U-shape having two side portions connected by a cross portion. The sides of the brace member 10 and the sides of the chock member are hingedly secured together at their extremities upon hinge rivets 13 so that the chock member may be swung inside the frame member 10, as shown in Fig. 1. The extremities of the sides of the brace member 12 is hingedly secured to the sides of the chock member 11 adjacent the cross portion of the latter by means of hinge rivets 14 so that the cross portion of the brace member will fold inside the rivets 13 as shown in Fig. 1. The cross portion of the chock member 11 is inwardly curved as shown at 15 to receive the tread of an automotive tire casing.

When desired for use, the chock member 15 is swung upwardly from the brace member 10 and the brace member 12 is swung downwardly and forwardly within the embrace of the frame member 10 as shown in Fig. 2.

The cross portion of the frame member 10 is then forced beneath the wheel of the vehicle allowing the tire tread to rest in the indented portion 15 of the chock member 11, as shown in Fig. 2.

In Figs. 3 and 4 an alternate form of the device is illustrated employing a U-shaped base frame member 16 similar to the frame member 10 of the previous form. In this form, however, a U-shaped chock member 17 is employed formed of angle iron which is hinged upon hinge rivets 18 at its open side to the extremities of the frame member 16. The angle iron 17 folds down around the base frame 16 as shown in Fig. 4.

In the working position the angle iron member 17 is supported in the position of Fig. 3 by means of an angle iron brace frame 19 which is bent in a U-shape to fit within the frame 17. The brace frame is mounted on pivot rivets 20 adjacent the cross member of the base frame 16. When in uses the device has the appearance of Fig. 3 and when folded the appearance of Fig. 4.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

A wheel chock comprising: a U-shaped frame member; a U-shaped chock member, said chock member being smaller than, and telescoping within, said frame member, the two extremities of the chock member lying within and against the two extremities of the frame member; a pair of hinge pins securing said extremities together; a U-shaped brace member telescopically fitted within said U-shaped chock member, said brace member being faced oppositely from the first two members so that its extremities will project oppositely to the extremities of the former members; and a second pair of hinge pins securing the extremities of said U-shaped brace member within said chock member adjacent the midportion of the latter.

JOHN M. CLESS.

REFERENCES CITED

The following references are of record in the file of this patent:

UNITED STATES PATENTS

| Number | Name | Date |
|---|---|---|
| 1,628,854 | Michod | May 17, 1927 |
| 1,746,415 | Burkart | Feb. 11, 1930 |
| 1,768,265 | Nicholls | June 24, 1930 |
| 2,184,487 | Clark | Dec. 26, 1939 |
| 2,250,026 | Laukhuff | July 22, 1941 |
| 2,316,178 | Morgensen, Jr. | Apr. 13, 1943 |
| 2,475,111 | Ridland | July 5, 1949 |

FOREIGN PATENTS

| Number | Country | Date |
|---|---|---|
| 189,013 | Switzerland | May 1, 1937 |